(12) United States Patent
Sekiguchi et al.

(10) Patent No.: US 9,213,452 B2
(45) Date of Patent: Dec. 15, 2015

(54) TOUCH SCREEN, DISPLAY DEVICE INCLUDING TOUCH SCREEN, AND MANUFACTURING METHOD FOR DISPLAY DEVICE INCLUDING TOUCH SCREEN

(75) Inventors: Shinji Sekiguchi, Kawasaki (JP); Hiroshi Oooka, Chiba (JP)

(73) Assignee: JAPAN DISPLAY INC., Tokyo (JP)

( * ) Notice: Subject to any disclaimer, the term of this patent is extended or adjusted under 35 U.S.C. 154(b) by 321 days.

(21) Appl. No.: 13/355,589

(22) Filed: Jan. 23, 2012

(65) Prior Publication Data

US 2012/0188199 A1    Jul. 26, 2012

(30) Foreign Application Priority Data

Jan. 26, 2011  (JP) .................................. 2011-14380

(51) Int. Cl.
  *G06F 3/041*  (2006.01)
  *G06F 3/044*  (2006.01)

(52) U.S. Cl.
  CPC ...... *G06F 3/044* (2013.01); *G06F 2203/04103* (2013.01); *Y10T 29/49105* (2015.01)

(58) Field of Classification Search
  None
  See application file for complete search history.

(56) References Cited

U.S. PATENT DOCUMENTS

| 2009/0256821 | A1  | 10/2009 | Mamba et al. | |
| 2010/0097556 | A1* | 4/2010 | Do et al. | 349/141 |
| 2010/0214260 | A1* | 8/2010 | Tanaka et al. | 345/174 |
| 2011/0084337 | A1* | 4/2011 | Yamazaki et al. | 257/347 |
| 2011/0242019 | A1* | 10/2011 | Jeong et al. | 345/173 |
| 2011/0248953 | A1* | 10/2011 | Lee et al. | 345/174 |
| 2012/0032927 | A1* | 2/2012 | Kim et al. | 345/176 |
| 2012/0068960 | A1* | 3/2012 | Kim et al. | 345/174 |

FOREIGN PATENT DOCUMENTS

| JP | 2009-258888 | 11/2009 |
| JP | 2010-277354 | 12/2010 |

OTHER PUBLICATIONS

Partial English translation of Office Action in connection with Corresponding Foreign Japanese Patent Application No. 2011-014380, mailed Aug. 19, 2014.

* cited by examiner

*Primary Examiner* — Adam R Giesy
(74) *Attorney, Agent, or Firm* — Lowe Hauptman & Ham, LLP

(57) ABSTRACT

A display device with a touch screen includes a display device that has a display area and a touch screen that has a detection area including a transparent electrode and a peripheral area located around the detection area. The touch screen being disposed in the display area. The peripheral area includes a connection electrode that is connected to the transparent electrode and an insulating film that includes a protrusion extending to the detection area. The protrusion is disposed to be superimposed on the connection electrode. The transparent electrode is disposed to cover a part in which the protrusion and the connection electrode are superimposed.

10 Claims, 16 Drawing Sheets

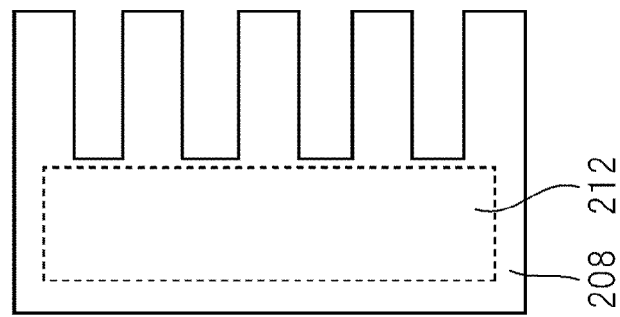
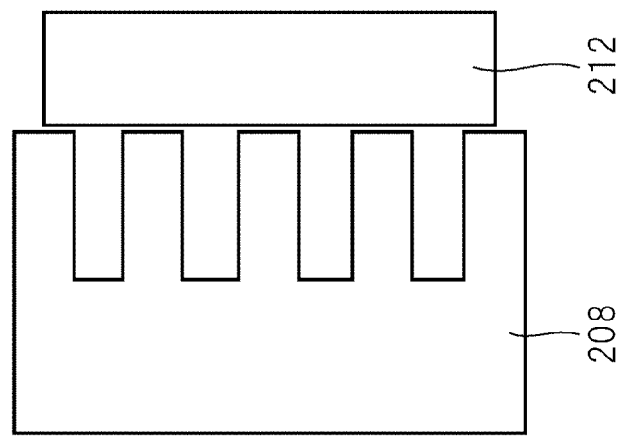
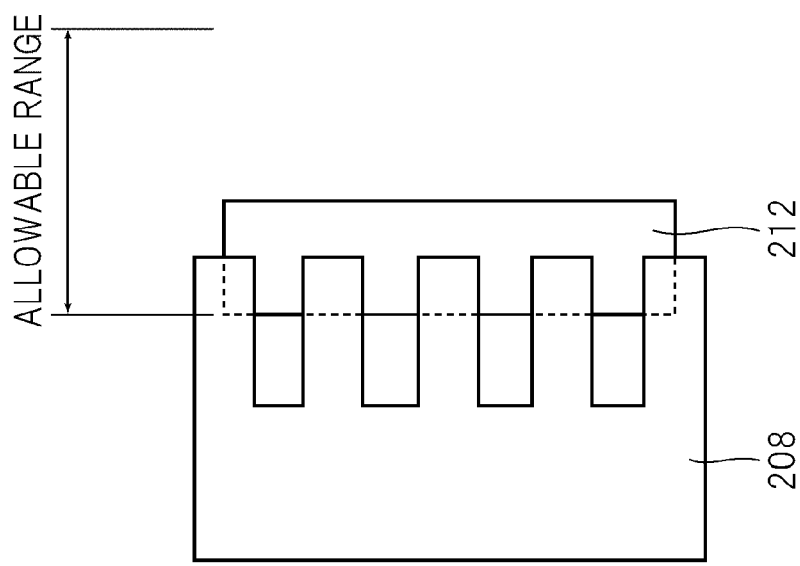

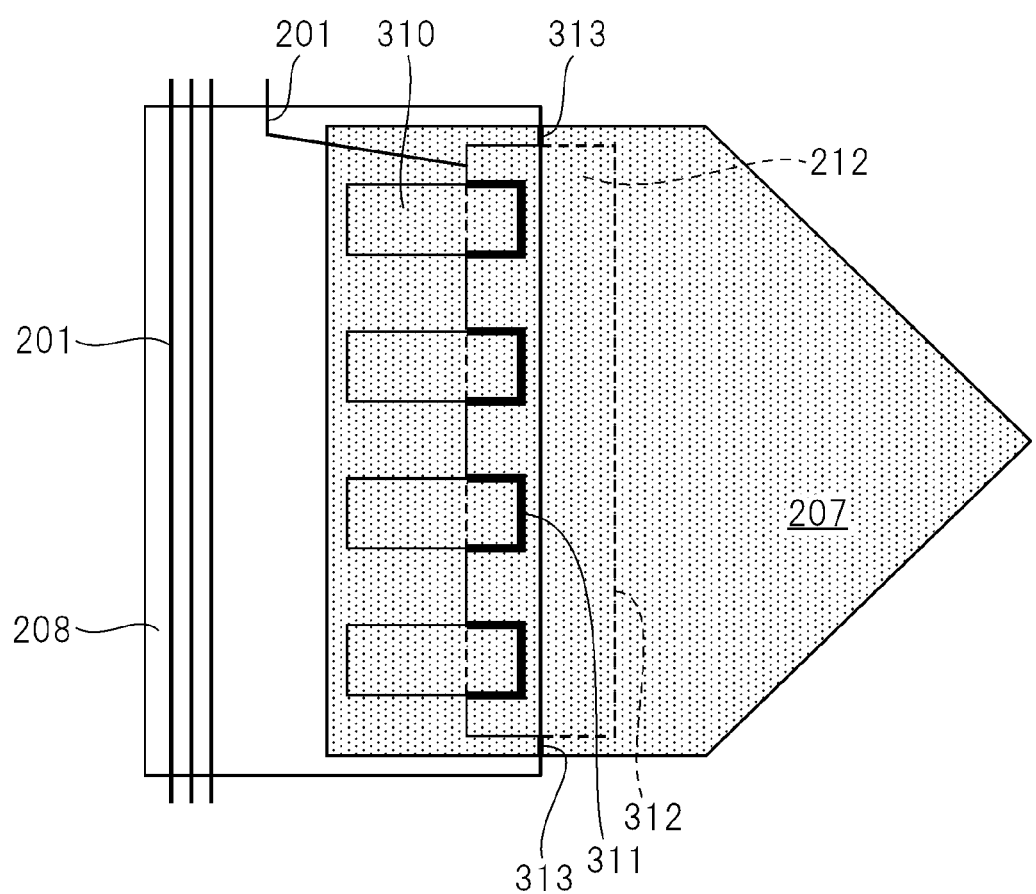

TOUCH SCREEN, DISPLAY DEVICE INCLUDING TOUCH SCREEN, AND MANUFACTURING METHOD FOR DISPLAY DEVICE INCLUDING TOUCH SCREEN

CROSS-REFERENCE TO RELATED APPLICATION

The present application claims priority from Japanese application JP2011-14380 filed on Jan. 26, 2011, the content to which is hereby incorporated by reference into this application.

BACKGROUND OF THE INVENTION

1. Field of the Invention

The present invention relates to a touch screen, a display device with a touch screen, and a manufacturing method thereof, and more particularly, to a capacitive touch screen, a display device with a touch screen, and a manufacturing method thereof.

2. Description of the Related Art

Display devices having an input unit (hereinafter, referred to as a touch screen) which inputs information through a pressing operation (hereinafter, referred to as touch) using a user s finger or the like have been known. Such display devices are used in mobile electronic apparatuses such as personal digital assistance (PDA) or mobile terminals, various home electric appliances, stationary information terminals such as unmanned reception apparatuses, and the like. Touch screens are classified into a resistive type detecting a variation in resistance of a touched part, a capacitive type detecting a variation in capacitance, and an optical sensor type detecting a variation in a light intensity of a part shielded by a touch.

The capacitive type has a merit that transmittance is higher than that of the resistive type or the optical sensor type. In the resistive type, since the touched position is sensed through mechanical contact with a resistive film, the resistive film is in danger of deteriorating or being damaged (cracked). The capacitive type needs no mechanical contact such as a contact of a detection electrode with another electrode and is thus advantageous in durability.

JP2009-258888A discloses a capacitive touch screen. Specifically, the touch screen includes vertical X electrodes and horizontal Y electrodes which are arranged in a matrix shape in the vertical and horizontal directions of the touch screen and a Z electrode that covers the plane of the touch screen and that is in an electrically-floating state. By employing this configuration, it is possible to detect coordinates on the basis of variations in capacitance between the X electrodes and the Z electrode and between the Y electrodes and the Z electrode, for example, due to a touch on the touch screen.

SUMMARY OF THE INVENTION

However, for example, when the above-mentioned touch screen is formed on a liquid crystal display panel, alignment precision of an insulating film and a connection electrode and the like may become inferior depending on a forming process thereof, thereby causing a problem such as short circuiting or disconnection. Specifically, this problem will be described below with reference to FIGS. 19 to 22.

FIGS. 19 to 22 are diagrams for explaining the problem solved by one or more embodiments of the present invention. Specifically, FIG. 19 is a sectional view illustrating an example where a connection electrode 101 is formed on a part of a glass substrate 103 and a transparent conductive material as a transparent electrode 102 is formed on a part of the glass substrate 103 on which the connection electrode 101 is formed.

The connection electrode 101 is an electrode which is connected to the transparent electrode 102 formed in a detection area of a touch screen and which is also connected to a terminal transmitting information acquired from the detection area to the outside. The transparent electrodes 102 form the detection area of a touch screen, are formed of a transparent conductive material such as Indium Tin Oxide (ITO), and are arranged in a matrix shape in the vertical and horizontal directions of the touch screen.

Here, when the transparent conductive material is directly formed on the connection electrode 101 to connect the transparent electrode 102 to the connection electrode 101, the connection electrode 101 has an inverse taper formed at an end thereof through an etching process of forming the connection electrode 101. Accordingly, as shown in FIG. 19, a problem of connection failure such as disconnection or short circuiting may occur in a part in which the transparent electrode 102 is superposed on the connection electrode 101.

Therefore, as shown in FIG. 20, it can be considered that an insulating film 104 such as an organic insulating film is first formed to cover a part of the connection electrode 101 and an ITO film is then formed. In this case, since a problem due to the inverse taper of the connection electrode 101 as described above is not caused, the problem of connection failure does not occur. However, in this case, when the alignment precision between the insulating film 104 and the connection electrode 101 is low, that is, when a printing process such as a screen printing process is used to form the insulating film 104, the problem of connection failure may occur in the part in which the transparent electrode 102 is superimposed on the connection electrode 101, as shown in FIG. 19.

Specifically, for example, when the alignment precision is low and thus the insulating film 104 is formed apart from the connection electrode 101 as shown in FIG. 21, the problem of connection failure may occur in the part in which the transparent electrode 102 is superimposed on the connection electrode 101. For example, when the insulating film 104 is formed on the top surface of the connection electrode 101 so as not to cover the inverse taper of the connection electrode 101 as shown in FIG. 22, the problem of connection failure may occur in the part in which the transparent electrode 102 is superimposed on the connection electrode 101.

One or more embodiments of the present invention can provide a display device with a touch screen which suppresses occurrence of disconnection or short circuiting even when alignment precision between an insulating film and a connection electrode is low.

(1) According to an aspect of the invention, there is provided a display device with a touch screen including a display device that has a display area and a touch screen that has a detection area including a transparent electrode and a peripheral area located around the detection area. The touch screen being disposed in the display area. The peripheral area includes a connection electrode that is connected to the transparent electrode and an insulating film that includes a protrusion extending to the detection area. The protrusion is disposed to be superimposed on the connection electrode. The transparent electrode is disposed to cover a part in which the protrusion and the connection electrode are superimposed.

(2) In the display device with a touch screen according to (1), the insulating film includes a plurality of protrusions along a length direction of the connection electrode.

(3) In the display device with a touch screen according to (2), the insulating film includes the plurality of protrusions at regular intervals along the length direction of the connection electrode.

(4) According to another aspect of the invention, there is provided a display device with a touch screen includes a display device that has a display area and a touch screen that has a detection area including a transparent electrode and a peripheral area located around the detection area. The touch screen being disposed in the display area. The peripheral area includes a connection electrode that is connected to the transparent electrode and an insulating film that includes an opening. The opening is disposed to be superimposed on the connection electrode. The transparent electrode is disposed to cover a part in which the opening and the connection electrode are superimposed.

(5) In the display device with a touch screen according to (4), the insulating film includes a plurality of openings along the length direction of the connection electrode.

(6) In the display device with a touch screen according to (5), the insulating film includes a plurality of openings at regular intervals along a length direction of the connection electrode.

(7) In the display device with a touch screen according to any one of (1) to (6), the peripheral area further includes a terminal that serves to transmit information acquired from the detection area to outside and an interconnection that connects the connection electrode to the terminal.

(8) The display device with a touch screen according to any one of (1) to (7), the insulating film is formed by using a screen printing process.

(9) In the display device with a touch screen according to any one of (1) to (8), the connection electrode, the terminal, and the interconnection are formed of a metal material.

(10) According to still another aspect of the invention, there is provided a method of manufacturing a display device with a touch screen. The method includes forming a metal film on a substrate forming a display area of a display device, forming a connection electrode by processing the formed metal film, forming an insulating film including a protrusion, which extends to a detection area in which a transparent electrode is formed, at a position overlapping with the connection electrode by using a printing process, forming a conductive material film forming the transparent electrode thereon, coating a resist film on the formed conductive material, forming the transparent electrode covering a part in which the protrusion is superimposed on the connection electrode by etching the formed conductive material film, removing the coated resist film, and forming a protective film on the resultant structure.

(11) According to still another aspect of the invention, there is provided a method of manufacturing a display device with a touch screen. The method includes forming a metal film on a substrate forming a display area of a display device, forming a connection electrode by processing the formed metal film, forming an insulating film including an opening at a position overlapping with the connection electrode by using a printing process, forming a conductive material film forming the transparent electrode thereon, coating a resist film on the formed conductive material, forming the transparent electrode covering a part in which the connection electrode and the opening are superimposed by etching the formed conductive material film, removing the coated resist film, and forming a protective film on the resultant structure.

(12) According to still another aspect of the invention, there is provided a touch screen having a detection area including a transparent electrode and a peripheral area located around the detection area. The peripheral area includes a connection electrode connected to the transparent electrode and an insulating film disposed to overlap with the connection electrode. The insulating film includes a protrusion extending to the detection area. A plurality of the protrusions are formed along a length direction of the connection electrode. The transparent electrode is disposed to cover a part in which the protrusions and the connection electrode are superimposed.

It is possible to provide a display device with a touch screen thereto which can suppress occurrence of disconnection or short circuiting described above even when a process with relatively low alignment precision is used in a process of manufacturing a touch screen.

BRIEF DESCRIPTION OF THE DRAWINGS

FIG. 15A is a diagram illustrating the allowable range of alignment precision between the connection electrode and an insulating film.

FIG. 15B is a diagram illustrating the allowable range of alignment precision between the connection electrode and an insulating film.

FIG. 15C is a diagram illustrating the allowable range of alignment precision between the connection electrode and an insulating film.

FIG. 17 is a plan view illustrating a connection relation between a connection electrode and a transparent electrode in a modified example.

DETAILED DESCRIPTION OF THE INVENTION

Figure 1:
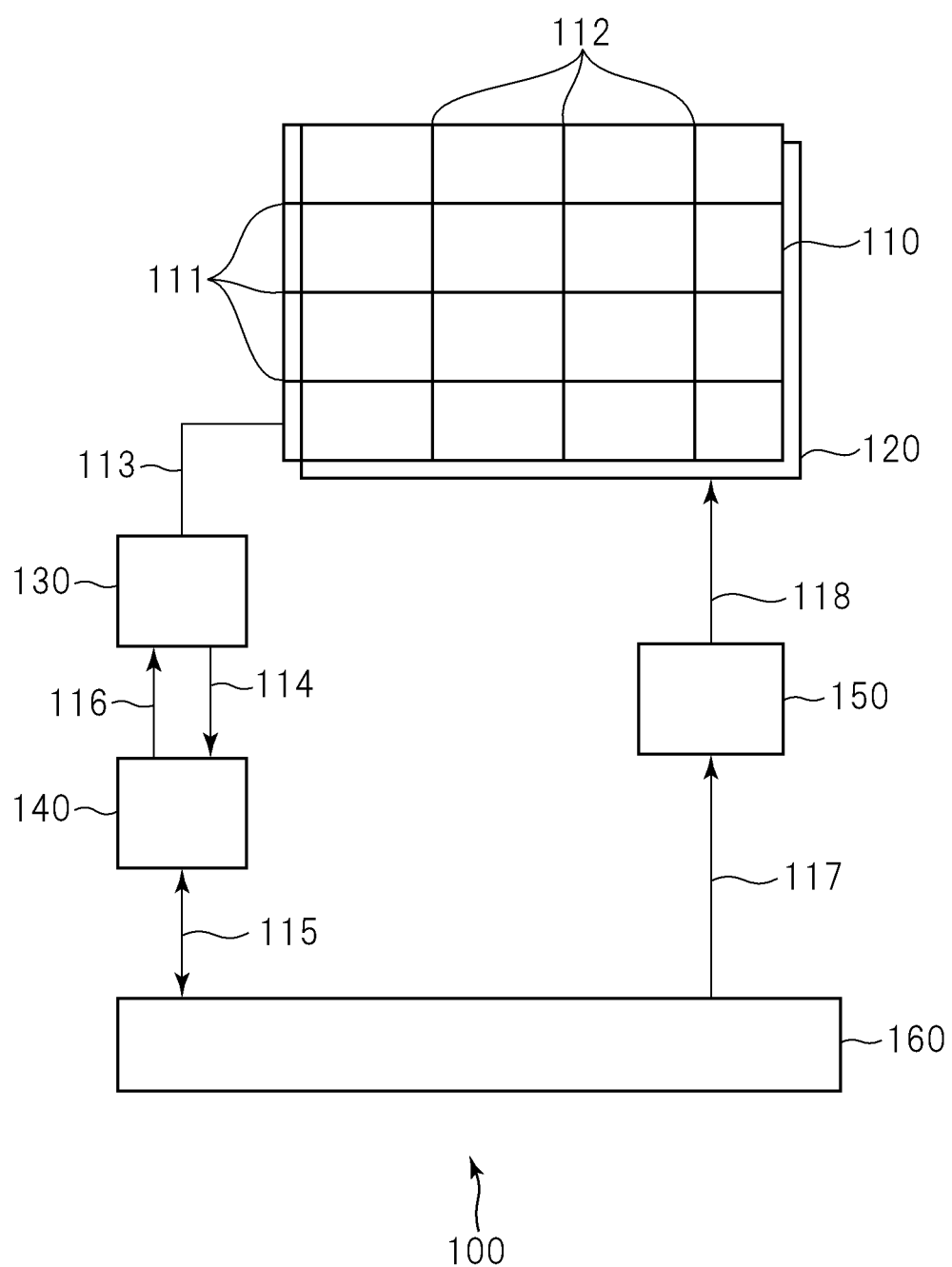
FIG. 1 is a diagram schematically illustrating the configuration of a display device with a touch screen according to an embodiment of the invention.

Hereinafter, an embodiment of the invention will be described with reference to the accompanying drawings. In the drawings, like elements are referenced by like reference signs and description thereof will not be repeated.

FIG. 1 is a diagram schematically illustrating the configuration of a display device with a touch screen according to an embodiment of the invention. As shown in FIG. 1, a display device 100 with a touch screen includes a touch screen 110, a display panel 120, a capacitance detecting unit 130, a control and calculation unit 140, a display control circuit 150, and a system 160.

As shown in FIG. 1, the touch screen 110 is formed on the display panel 120. The touch screen 110 includes a touch plane receiving an external touch and plural X electrodes 111 and plural Y electrodes 112 arranged in a matrix shape in the touch screen 110. The plural X electrodes 111 and the plural Y electrodes 112 are used to detect a position at which the touch plane is touched. The plural X electrodes 111 and the plural Y electrodes 112 are connected to plural terminals (not shown) formed on the touch screen 110. The terminals are connected to the capacitance detecting unit 130 via detection lines 113, respectively.

The capacitance detecting unit 130 detects the capacitance among the X electrodes 111 and the Y electrodes 112 and a user s finger and the like through the use of the detection lines 113 connected thereto.

A capacitance detecting signal 114, which varies depending on the capacitance value output from the capacitance detecting unit 130, is input to the control and calculation unit 140. The control and calculation unit 140 acquires signal components of the electrodes 111 and 112 from the capacitance detecting signal 114, calculates input coordinates from the signal components of the electrodes 111 and 112, outputs an interface signal (I/F signal) 115, and outputs a detection control signal 116 for controlling the capacitance detecting unit 130.

The system 160 receives the I/F signal 115 including the input coordinates output from the control and calculation unit 140 and outputs a display control signal 117 to the display control circuit 150.

The display control circuit 150 generates a display signal 118 in response to the display control signal 117 and outputs the generated display signal to the display panel 120. The display panel 120 displays an image corresponding to the display signal 118.

The present invention is not limited to the above-mentioned configuration, but can be modified in various forms. For example, in FIG. 1, three X electrodes 111 and three Y electrodes 112 are shown for the purpose of simplification of explanation, but the numbers of the X electrodes 111 and Y electrodes 112 are not limited thereto.

Figure 2:
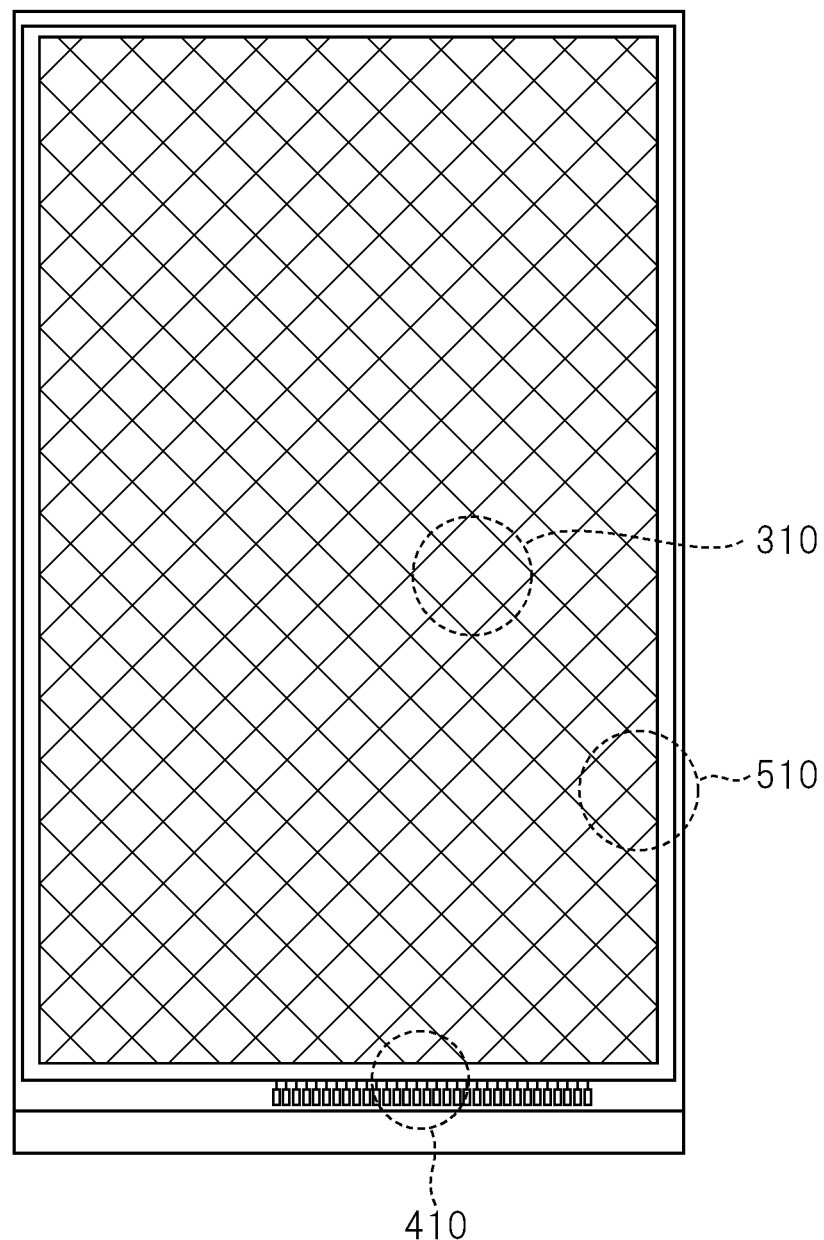
FIG. 2 is a diagram schematically illustrating the configuration of a touch screen.
Figure 3:
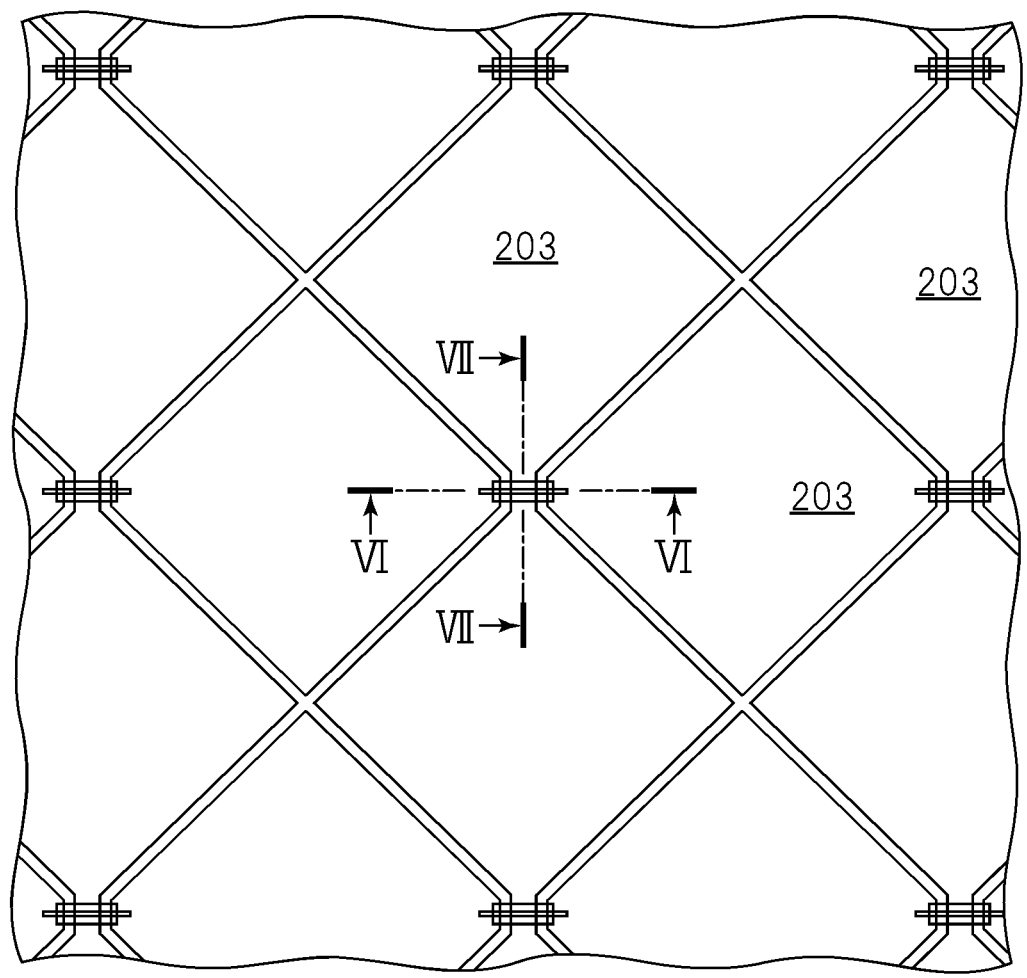
FIG. 3 is a partially-enlarged view of a detection area of the touch screen.
Figure 4:
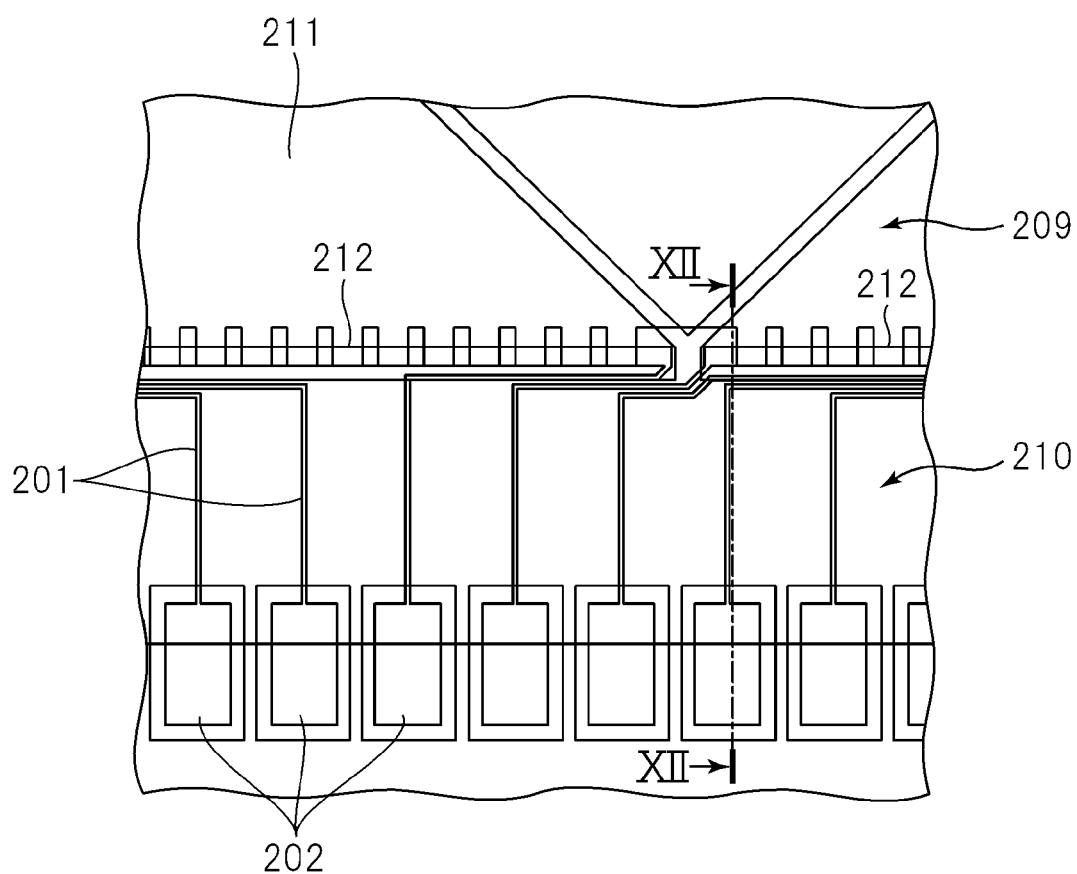
FIG. 4 is a partially-enlarged view of a peripheral area of the touch screen.
Figure 5:
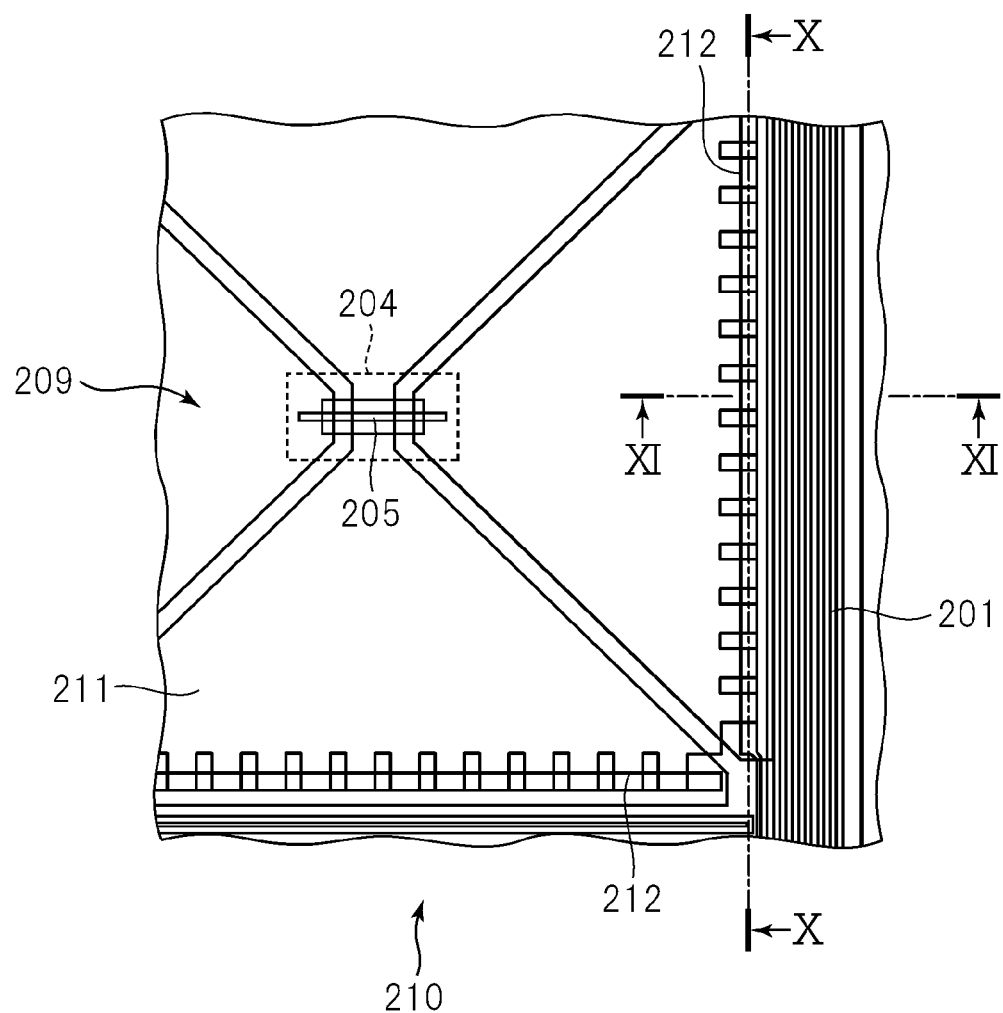
FIG. 5 is a partially-enlarged view of the peripheral area of the touch screen at a connection part to a terminal.

FIG. 2 is a plan view schematically illustrating the configuration of the touch screen shown in FIG. 1. FIG. 3 is an enlarged view of a part 310 of the detection area of the touch screen shown in FIG. 1. FIG. 4 is an enlarged diagram of a part 410 of the peripheral area of the touch screen shown in FIG. 1. FIG. 5 is an enlarged view of a part 510 of the peripheral area of the touch screen at a connection part to the terminal shown in FIG. 1.

As shown in FIGS. 2 to 5, the touch screen 110 includes the plural electrodes 111 and 112 arranged in a matrix shape, lines 201 connected to the electrodes 111 and 112, and terminals 202 connecting the lines 201 to outside.

Specifically, as shown in FIG. 3, the electrodes 111 and 112 arranged in a matrix shape are formed to include plural rectangular areas 203. That is, the plural rectangular areas 203 are connected vertically and horizontally at parts (connection parts) including vertexes of the rectangular areas 203 so as to form the plural electrodes 111 and 112 in the vertical direction and the horizontal direction.

Figure 6:
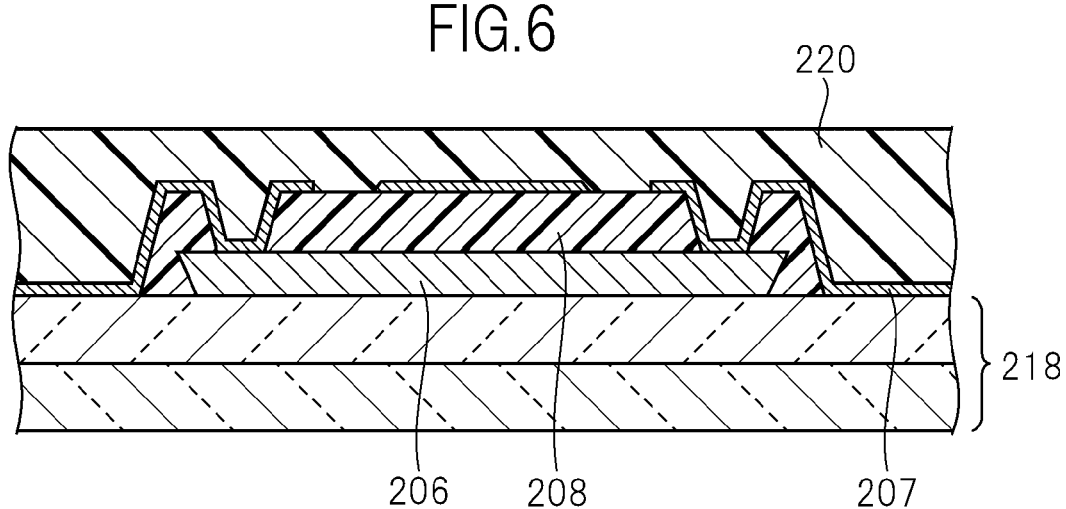
FIG. 6 is an enlarged sectional view taken along line VI-VI of FIG. 3.
Figure 7:
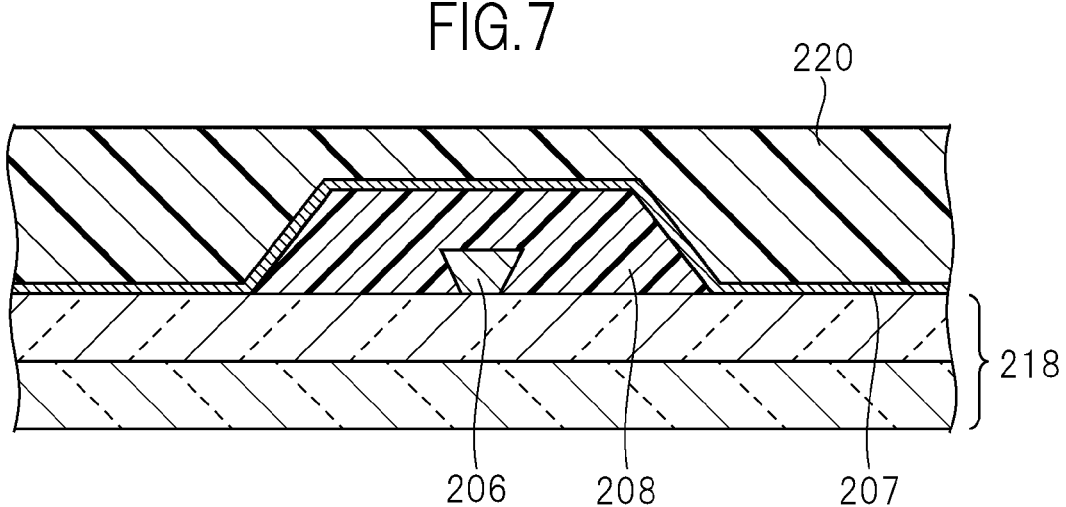
FIG. 7 is an enlarged sectional view taken along line VII-VII of FIG. 3.

The configuration of the connection parts will be described below in detail with reference to FIGS. 6 and 7. FIG. 6 is an enlarged sectional view taken along line VI-VI of FIG. 3. FIG. 7 is an enlarged sectional view taken along line VII-VII of FIG. 3.

As shown in FIG. 6, regarding the electrodes 111 in the horizontal direction, the neighboring rectangular areas 203 are connected to each other via a crossed electrode 205 formed of a metal material 206. The metal material 206 includes, for example, an alloy (Ag—Pd—Cu alloy) of silver, palladium, and copper and preferably has low reflectance. In this embodiment, it is assumed that the Ag—Pd—Cu alloy (hereinafter, referred to as APC) is used as the metal material 206. The rectangular areas 203 are formed of a transparent conductive material (hereinafter, referred to as ITO) such as a low-temperature indium tin oxide (ITO).

On the other hand, regarding the electrodes 112 in the vertical direction, the neighboring rectangular areas 203 formed of an ITO 207 are connected to each other via the ITO 207 as shown in FIG. 7. Here, the APC 206 and the ITO 207 are insulated from each other with an insulating film 208 interposed therebetween. The insulating film 208 is formed of, for example, an organic insulating film. The top surfaces of the electrodes 111 and 112 are covered, for example, with an organic protective film 220 of resin or the like.

By sequentially connecting the rectangular areas 203 in the vertical and horizontal directions as described above, the plural electrodes 111 and 112 arranged in a matrix shape are formed. As shown in FIGS. 6 and 7, the APC 206, the insulating film 208, the ITO 207, and the organic protective film 220 are sequentially formed on a liquid crystal display panel 218, which will be described later in detail.

The configuration of the end portion of a detection area 209 of the touch screen 110 in which the electrodes 111 and 112 are arranged and a peripheral area 210 around the detection area 209 (hereinafter, referred to as peripheral area) will be described below.

As shown in FIGS. 4 and 5, the touch screen 110 includes the plural lines 201, the terminals 202 connected to the lines 201, and electrodes 212 (hereinafter, referred to as connection electrode) disposed along the sides of the detection area 209 in the peripheral area 210. Electrodes 211 (hereinafter, referred to as end electrode) at the end of the detection area 209 have a substantially triangular shape corresponding to a half of the rectangular area 203 along the sides of the detection area 209. The end electrodes 211 are connected to the connection electrodes 212. Each end electrode 211 is connected to the corresponding line 201 via the corresponding connection electrode 212. The connection electrodes 212 are formed of the APC 206, and the end electrodes 211 are formed of the ITO 207.

Figure 8:
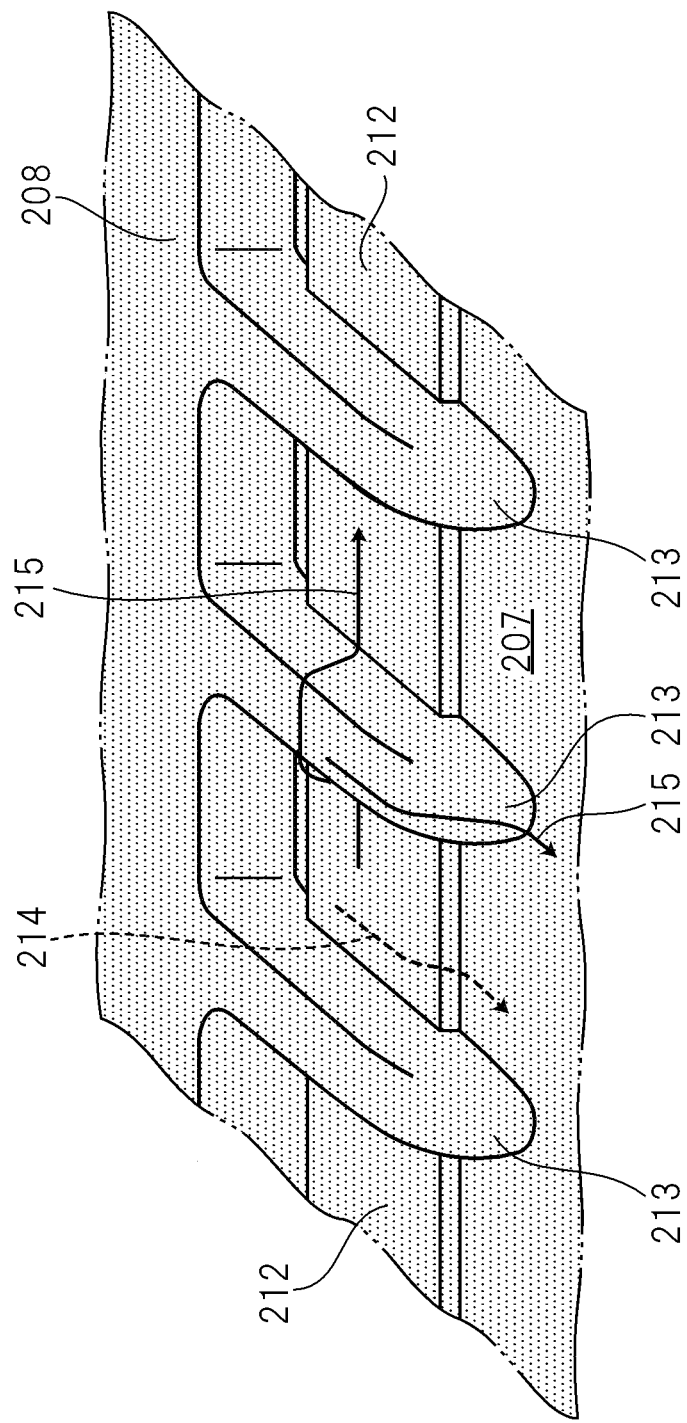
FIG. 8 is a diagram illustrating protrusions.

The configuration around the connection parts will be described below in more detail with reference to FIG. 8. As shown in FIG. 8, in the connection parts of the connection electrodes 212 and the end electrodes 211, the insulating film 208 disposed on the liquid crystal display panel 218 includes plural protrusions 213. The protrusions 213 are disposed to overlap with the connection electrodes 212. The ITO 207 constituting the end electrodes 211 and the like is formed on the protrusions 213 and the connection electrodes 212 through an ITO forming process.

The protrusion 213 may have shapes other than the substantially rectangular shape shown in FIG. 8, such as a shape decreasing in width toward the detection area 209 or a rounded shape as viewed from the upside of FIG. 8, as long as it extends to the detection area. The protrusions 213 are formed at regular intervals along the side of the connection electrode 212 in FIG. 8 or the like, but the intervals may not be regular but different from each other.

The number of protrusions 213 is not limited to the number shown in the drawing, but may be another number, as long as it is equal to or greater than 1. The length of the protrusion 213 to the detection area 209 is preferably in the range of 200 µm to 230 µm. The width of the connection electrode 212 is preferably about 50 µm.

The connecting relation between the connection electrode 212 and the ITO 207 will be described below with reference to FIG. 8. As shown in FIG. 8, since the connection electrode 212 has an inverse tapered shape in the direction indicated by an arrow 214 as described above, the ITO 207 may fail to be connected due to the level difference based on the connection electrode 212. On the other hand, since the insulating film 208 is formed in the direction indicated by an arrow 215 as described above and the level difference based on the connection electrode 212 is not formed, the connection failure does not occur, and both are electrically connected to each other.

Figure 9:
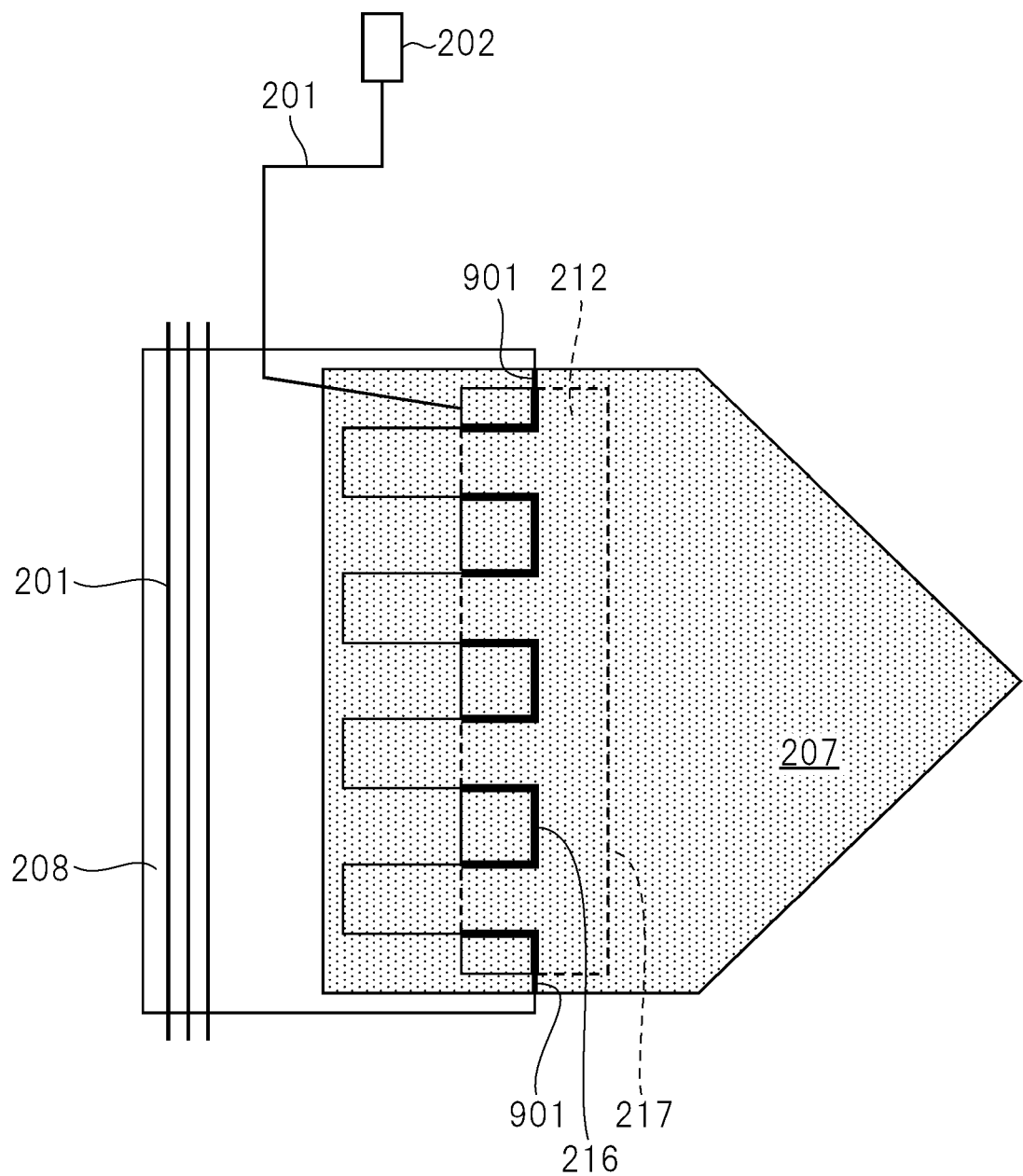
FIG. 9 is a plan view illustrating a connecting relation between a connection electrode and a transparent electrode.

The connection between the connection electrode 212 and the transparent electrode 207 in this embodiment will be described below with reference to a plan view. FIG. 9 is a plan view illustrating the connecting relation between the connection electrode and the transparent electrode.

As shown in FIG. 9, the connection electrode 212 and the ITO 207 are connected to each other in the part indicated by a connected line 216. On the other hand, as described above, the connection failure of the ITO 207 may occur in the part indicated by a broken line 217 due to the influence of the level difference based on the connection electrode 212 and the inverse taper. In the surmounting part 901 from the detection area 209 to the insulating film 208, since the level difference based on the connection electrode 212 is not formed, the connection of the ITO 207 is maintained.

As described above, the connection electrode 212 is connected to the terminal 202 via the line 201. The line 201 and the connection electrode 212 are formed of the APC 206 as described above. The line 201 is covered with the insulating film 208. By employing this configuration, it is possible to suppress the connection failure between the connection electrode 212 and the ITO 207.

The configuration in which the connection electrode 212 is connected to the transparent electrode 207 in this embodiment will be described below with reference to a sectional view.

Figure 10:
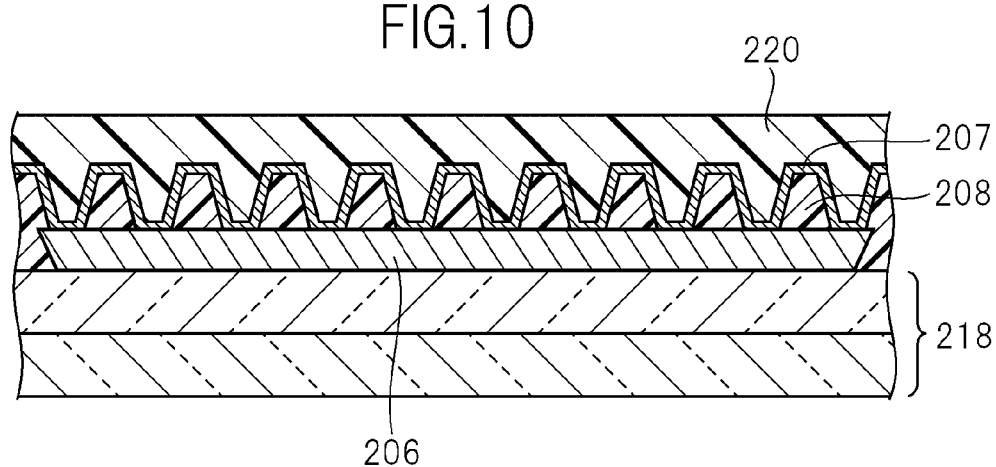
FIG. 10 is an enlarged sectional view taken along line X-X of FIG. 5.

FIG. 10 is an enlarged view taken along line X-X of FIG. 5. As shown in FIG. 10, the APC 206 constituting the connection electrode 212 and the insulating film 208 including the protrusions 213 are formed on the color filter substrate of the liquid crystal display panel 218 sequentially from the liquid crystal display panel 218 side. The organic protective film 220 is formed on the ITO 207. The thickness of the ITO 207 is about 15 nm, the thickness of the insulating film 208 is about 2 µm, and the thickness of the APC 206 is about 270 nm, for example.

Figure 11:
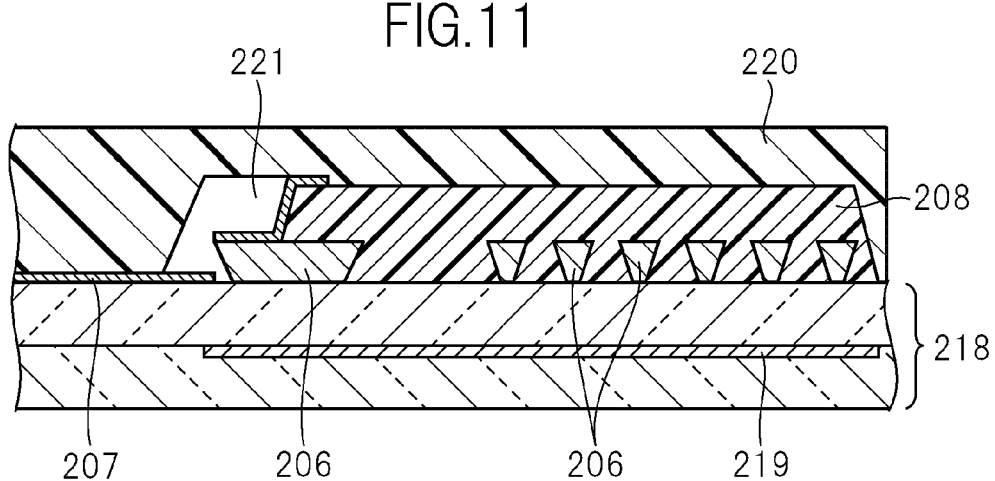
FIG. 11 is an enlarged sectional view taken along line XI-XI of FIG. 5.

FIG. 11 is an enlarged sectional view taken along line XI-XI of FIG. 5. As shown in FIG. 11, the lines 201 formed of the APC 206 are covered with the insulating film 208. In the connection part between the connection electrode 212 and the transparent electrode 211, a part of the top surface of the APC 206 constituting the connection electrode 212 is covered with the ITO 207. The part 221 in the drawing shows that the protrusion 213 at the back side is visible. For example, a black matrix 219 is formed in the liquid crystal display panel 218 below the peripheral area 210.

Figure 12:
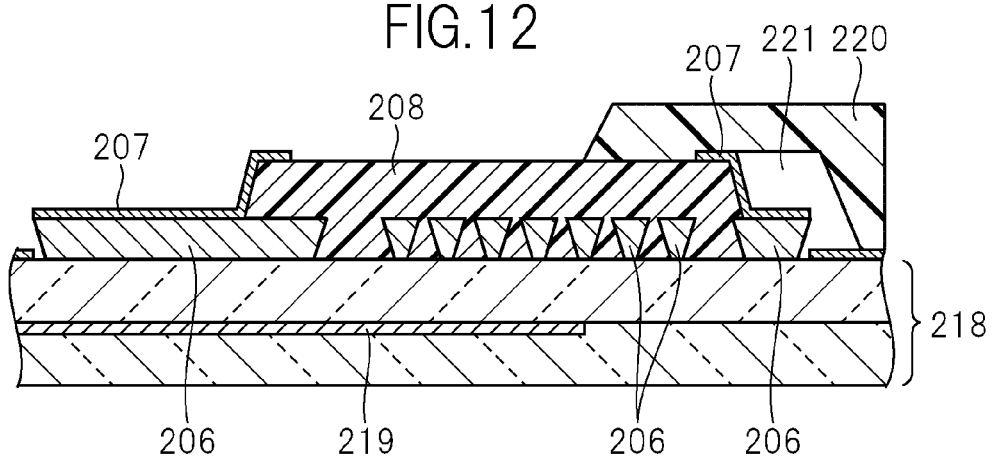
FIG. 12 is an enlarged sectional view taken along line XII-XII of FIG. 4.

FIG. 12 is an enlarged sectional view taken along line XII-XII of FIG. 4. As shown in FIG. 12, the line 201 (which is formed of the APC 206) connected to the terminal 202 is covered with the insulating film 208. The ITO 207 constituting the line 201 connected to the corresponding to the electrodes 211 and 212 is formed on the top surface of the APC 206 constituting the terminal 202. In the connection part between the connection electrode 212 and the transparent electrode 211, a part of the top surface of the APC 206 constituting the connection electrode 212 is covered with the ITO 207, as described above.

A method of manufacturing the touch screen 110 according to this embodiment will be described below with reference to a sectional view of the connection part and a plan view of the electrodes. FIGS. 13A to 13H are sectional views illustrating a process of manufacturing a touch screen and including the connection part of the touch screen. FIGS. 14A to 14D are plan views illustrating the process of manufacturing a touch screen, where an electrode of the touch screen is mainly shown.

Figure 13A:
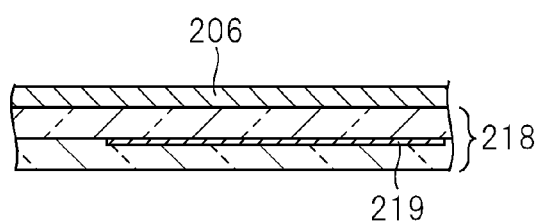
FIG. 13A is a diagram illustrating a process of manufacturing the touch screen.

First, as shown in FIG. 13A, the APC 206 is formed on the color filter substrate of the liquid crystal display panel 120, for example, using a known sputtering method. Here, the thickness of the APC 206 is, for example, 270 nm.

Figure 13E:
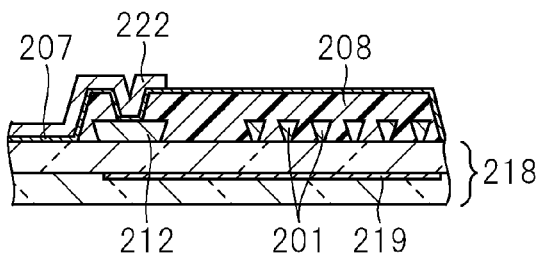
FIG. 13E is a diagram illustrating a process of manufacturing the touch screen.
Figure 13B:
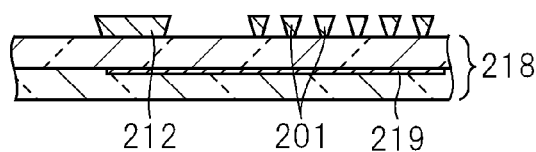
FIG. 13B is a diagram illustrating a process of manufacturing the touch screen.
Figure 14A:
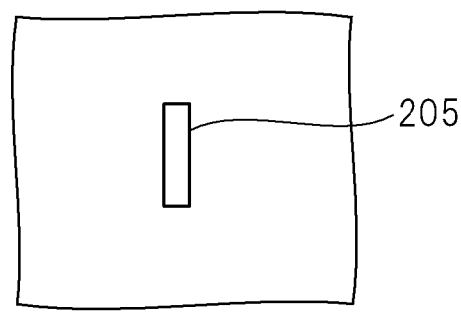
FIG. 14A is a diagram illustrating the process of manufacturing the touch screen.

Then, as shown in FIG. 13B, the APC 206 is processed, for example, using a known photolithography process to form the connection electrode 212 and the line 201. At this time, the crossed electrode 205 is formed as shown in FIG. 14A. At this time, the connection electrode 212 and the like have an inverse tapered shape at an end thereof as described above.

Figure 13F:
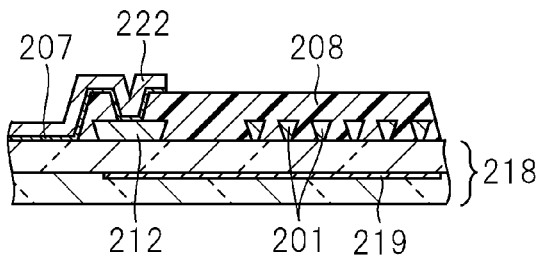
FIG. 13F is a diagram illustrating a process of manufacturing the touch screen.
Figure 13C:
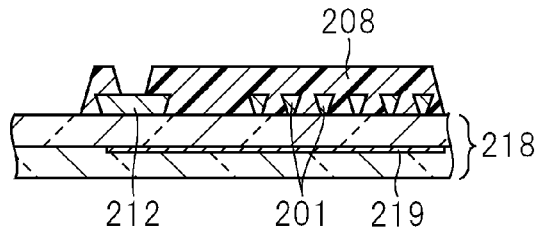
FIG. 13C is a diagram illustrating a process of manufacturing the touch screen.
Figure 14B:
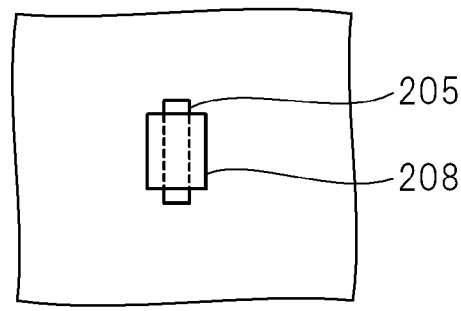
FIG. 14B is a diagram illustrating the process of manufacturing the touch screen.

Then, as shown in FIG. 13C, the insulating film 208 is formed, for example, using a known screen printing method. Specifically, as shown in FIG. 13C, the insulating film 208 is formed to cover the line 201 and a part of the connection electrode 212. At this time, as shown in FIG. 14B, the insulating film 208 is formed on the crossed electrode 205 to cover a part of the crossed electrode 205. The thickness of the insulating film 208 is, for example, about 2 μm.

Figure 13G:
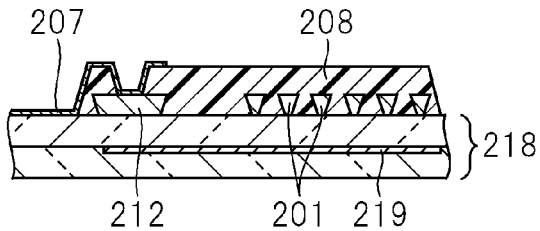
FIG. 13G is a diagram illustrating a process of manufacturing the touch screen.
Figure 13D:
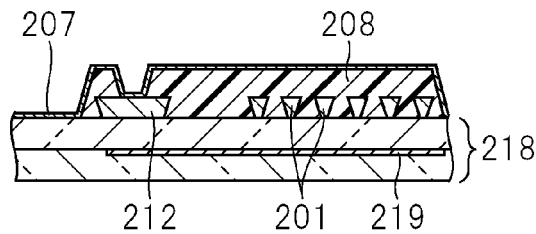
FIG. 13D is a diagram illustrating a process of manufacturing the touch screen.
Figure 14C:
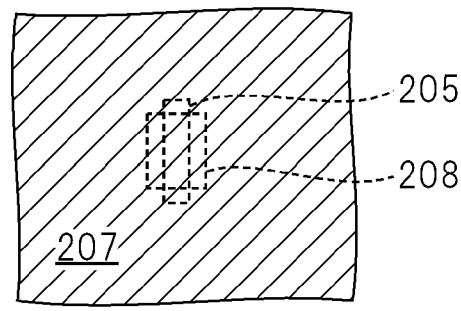
FIG. 14C is a diagram illustrating the process of manufacturing the touch screen.

Then, as shown in FIG. 13D, the ITO 207 is formed, for example, using a sputtering method. At this time, as shown in FIG. 14C, the ITO 207 is formed around the crossed electrode 205. The thickness of the ITO 207 is, for example, about 15 nm.

Figure 14D:
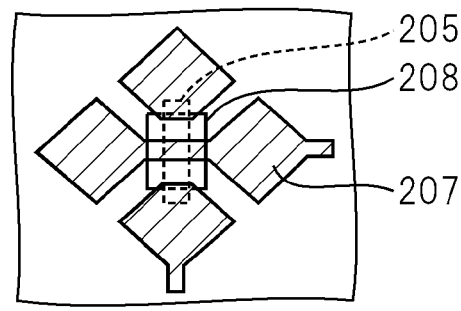
FIG. 14D is a diagram illustrating the process of manufacturing the touch screen.

Then, a resist 222 used to process the ITO 207 is coated using a screen printing method as shown in FIG. 13E, and then the ITO 207 is processed through the use of an etching method as shown in FIG. 13F. At this time, the plural rectangular areas 203 of the electrodes 111 and 112 formed of the ITO 207 are formed as shown in FIG. 14D.

Figure 13H:
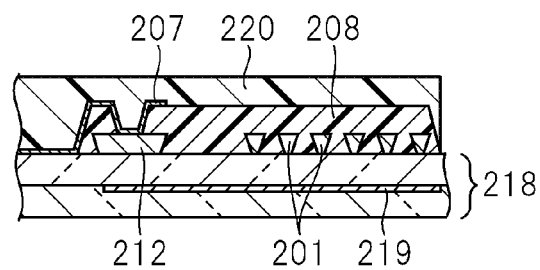
FIG. 13H is a diagram illustrating a process of manufacturing the touch screen.

Then, as shown in FIG. 13G, the resist 222 is removed and then the protective film 220 is formed using a screen printing method as shown in FIG. 13H.

In this way, the touch screen 110 is formed on the liquid crystal display panel 120. Although it has been explained that the screen printing method which is generally lower in alignment precision but lower in cost than an offset printing method is used, other printing methods such as an offset printing method may be used. The processes of photolithography, screen printing, and sputtering and the configuration of the liquid crystal display panel 218 are known well and thus will not be described.

By employing the above-mentioned configuration, it is possible to form the touch screen 110 with reduced disconnection or short circuiting on a liquid crystal display panel 218, even when a manufacturing process with low alignment precision is used. This point will be described below in more detail with reference to FIGS. 15 and 16.

FIG. 15 is a diagram illustrating the allowable range of alignment precision of the connection electrode and the insulating film in this embodiment. FIG. 16 is a diagram illustrating the allowable range of alignment precision of the connection electrode and the insulating film when the insulating film does not include the protrusions as in this embodiment.

In this embodiment, when the connection electrode 212 and the insulating film 208 overlap with each other as described above, apart having no level difference based on the connection electrode 212 is formed and the connection of the ITO 207 is maintained. Accordingly, in order to prevent the disconnection of the ITO 207, as shown in FIG. 15A, the allowable range of alignment between the insulating film 208 and the connection electrode 212 is present between FIGS. 15B and 15C in which the connection electrode 212 and the insulating film 208 do not overlap.

Figure 16C:
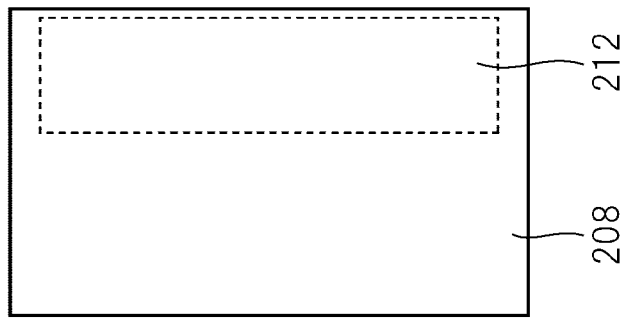
FIG. 16C is a diagram illustrating the allowable range of alignment precision between the connection electrode and the insulating film.
Figure 16B:
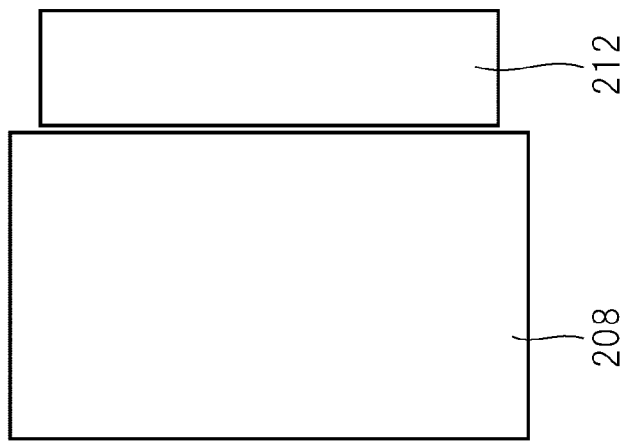
FIG. 16B is a diagram illustrating the allowable range of alignment precision between the connection electrode and the insulating film.
Figure 16A:
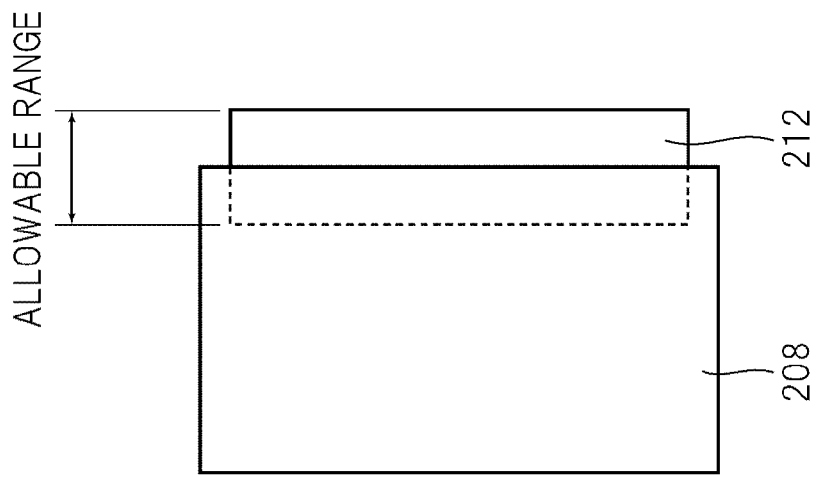
FIG. 16A is a diagram illustrating the allowable range of alignment precision between the connection electrode and the insulating film.

On the other hand, when the insulating film 208 does not include the protrusions 213 as in this embodiment, the allowable range of alignment between the connection electrode 212 and the insulating film 208 is present between FIGS. 16B and 16C in which the connection electrode 212 and the insulating film 208 do not overlap, as shown in FIG. 16A, so as not to disconnect the ITO 207.

As can be seen from FIGS. 15A and 16A, according to this embodiment, the allowable range of alignment precision between the insulating film 208 and the connection electrode 212 can be increased by the length of the protrusions 213. Accordingly, even when the alignment precision is low, it is possible to form the touch screen 110 with reduced disconnection and short circuiting.

Therefore, as described above, for example, a printing process with low alignment precision (with an error of about ±100 μm) such as a screen printing method can be used in the process of manufacturing the touch screen 110. Specifically, for example, a printing method with low cost and low alignment precision such as a screen printing method can be used instead of an offset printing method having high alignment precision and high cost or a photolithography method having high alignment precision and high cost but requiring high-temperature and light-irradiation processes. As a result, it is possible to realize a display device with a low-cost touch screen, compared with the case where the offset printing method is used.

Since a printing method such as a screen printing method can be used, the photolithography process is not necessary, for example, in FIGS. 13C to 13H. Therefore, a high-temperature process (200° C. or higher) necessary for the photolithography method is not necessary, thereby achieving low temperature of the process of manufacturing the touch screen 110. The light-irradiation process necessary for the photolithography method is not necessary and thus it is possible to avoid complication of the processes and to decrease the cost, compared with the case where the photolithography method is used.

The touch screen 110 can be formed directly on the liquid crystal display panel 218 in which a liquid crystal is enclosed due to the low temperature of the processes. Accordingly, it is not necessary to provide the glass substrate 103 to the touch screen 110 and thus to realize a liquid crystal display panel with a light and thin touch screen and a display device having the liquid crystal display panel 218. That is, it is possible to realize the liquid crystal display panel 218 having a capacitive touch screen 110 with the similar weight and thickness as the liquid crystal display panel of the related art. Although it has been stated that the touch screen 110 is formed directly on the liquid crystal display panel 218, the touch screen 110 may be formed on a light-transmitting substrate and then may be superimposed on the liquid crystal display panel 218.

One or more embodiments of the present invention is not limited to the above-mentioned embodiment, but may employ substantially the same configuration and method as described in the embodiment and any configuration or method which can achieve the same operational effect or advantages. For example, although the liquid crystal display device with a touch screen using a liquid crystal display panel has been explained above, one or more embodiments of the present invention is not limited to the case, but may be applied to other display devices using other display panels such as an organic electroluminescence (EL) panel.

Modified Example

A modified example of one or more embodiments of the invention will be described below. This modified example is different from the above-mentioned embodiment, in that openings 310 are formed in the insulating film 208 instead of the protrusions 213 in the above-mentioned embodiment. The other elements are similar to the above-mentioned embodiment and thus will not be described.

FIG. 17 is a plan view illustrating the connecting relation between the connection electrode and the transparent electrode in this modified example. As shown in FIG. 17, the insulating film 208 in this modified example includes the plural openings 310 (slits). The openings 310 may have other shapes such as a circular shape or an elliptical shape other than the rectangular shape shown in FIG. 17.

In this modified example, when the connection electrode 212 and the insulating film 208 overlap as in the above-mentioned embodiment, a part not having a level difference based on the connection electrode 212 is formed and the connection of the ITO 207 is maintained. Accordingly, as shown in FIG. 17, the connection electrode 212 and the ITO 207 are connected to each other in the part indicated by a connected line 311. On the other hand, as described above, since the connection electrode 212 has an inverse tapered shape, the ITO 207 may be disconnected in the part indicated by a broken line 312. In a surmounting part 313 from the detection area 209 to the insulating film 208, since the level difference based on the connection electrode 212 is not formed, the connection of the ITO 207 is maintained.

Figure 18C:
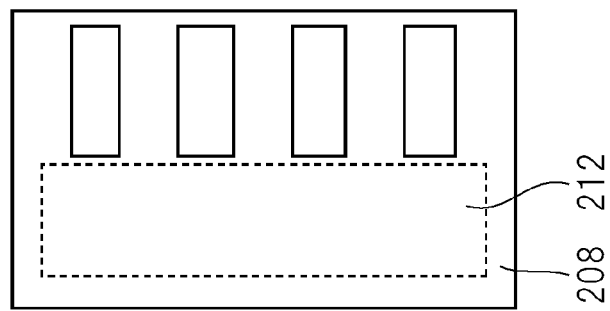
FIG. 18C is a diagram illustrating the allowable range of alignment precision in the modified example.
Figure 18B:
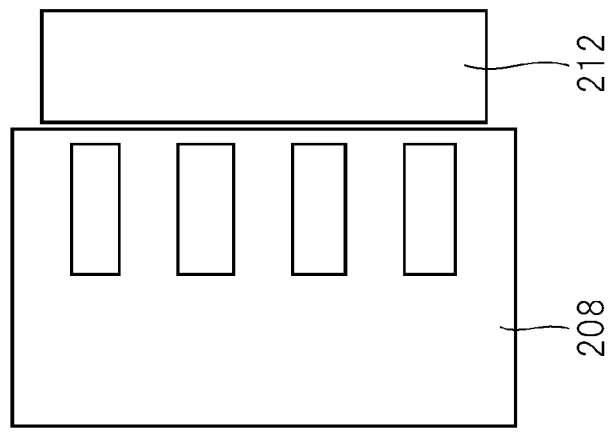
FIG. 18B is a diagram illustrating the allowable range of alignment precision in the modified example.
Figure 18A:
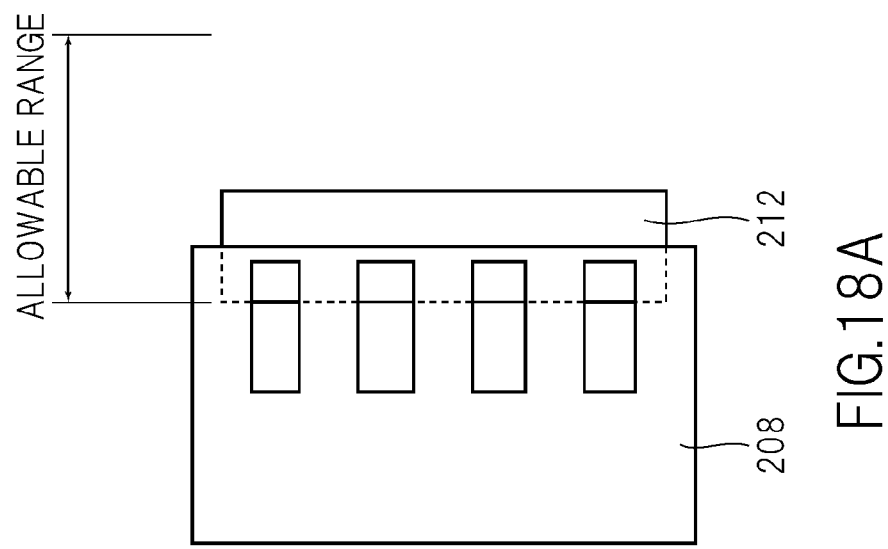
FIG. 18A is a diagram illustrating the allowable range of alignment precision in the modified example.
Figure 19:
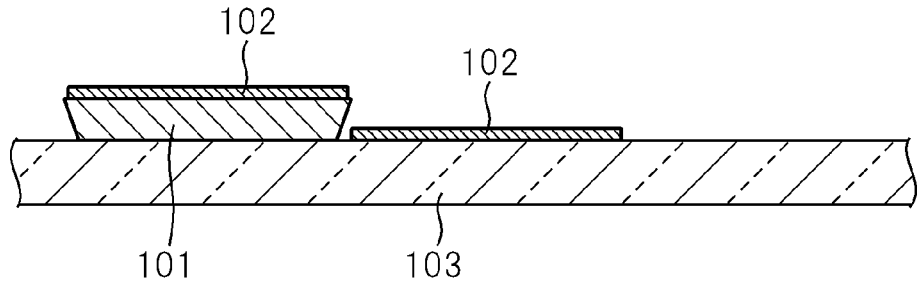
FIG. 19 is a diagram illustrating a problem according to the invention.
Figure 20:
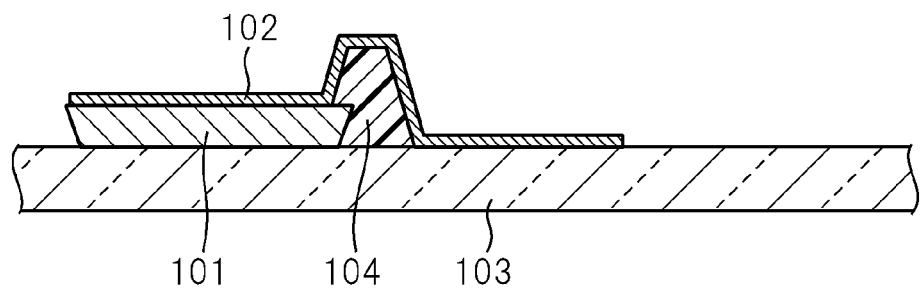
FIG. 20 is a diagram illustrating a problem according to the invention.
Figure 21:
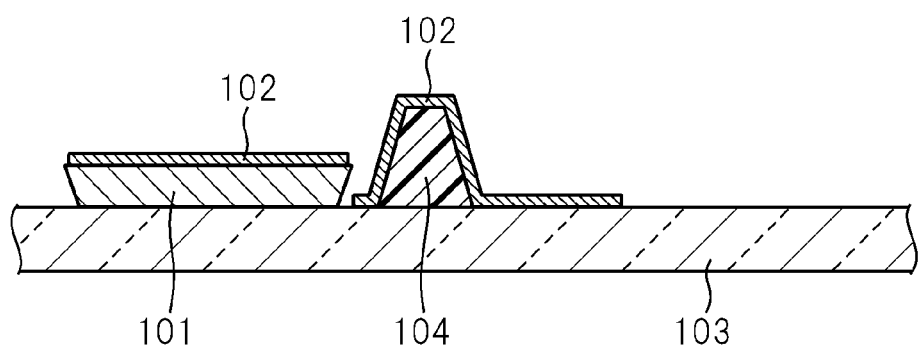
FIG. 21 is a diagram illustrating a problem according to the invention.
Figure 22:
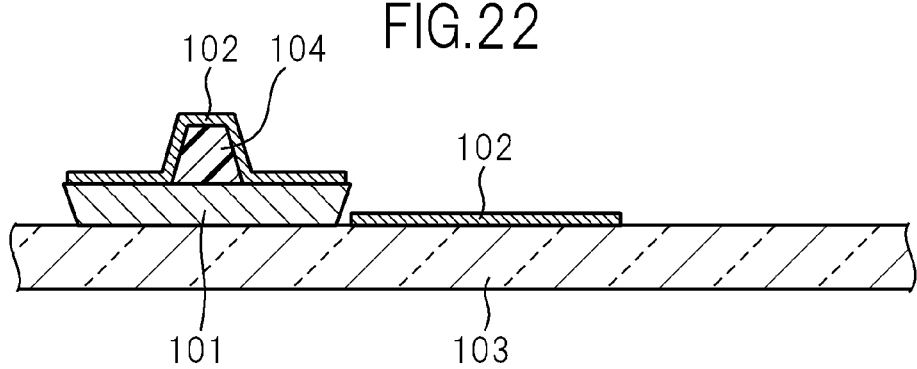
FIG. 22 is a diagram illustrating a problem according to the invention.

The allowable range of alignment precision between the connection electrode 212 and the insulating film 208 in this modified example will be described below. FIGS. 18A to 18C are diagrams illustrating the allowable range of alignment precision in this modified example.

As described above, the insulating film 208 in this modified example includes the plural rectangular openings 310 (slits). As described above, when the connection electrode 212 and the insulating film 208 overlap with each other as described above, a part having no level difference based on the connection electrode 212 is formed and the connection electrode 212 and the ITO 207 are connected. Accordingly, in order to prevent the disconnection of the ITO 207, as shown in FIG. 18A, the allowable range of alignment between the insulating film 208 and the connection electrode 212 is present between FIGS. 18B and 18C in which the connection electrode 212 and the insulating film 208 do not overlap.

As can be seen from FIGS. 18A and 16A, according to this embodiment, the allowable range of alignment precision between the insulating film 208 and the connection electrode 212 or the like can be increased by the length in the direction toward the detection area of the openings 310.

As in the above-mentioned embodiment, a printing process with low alignment precision (with an error of about ±100 μm) such as a screen printing method can be used in the process of manufacturing the touch screen 110. Specifically, for example, a printing method with low cost and low alignment precision such as a screen printing method can be used instead of an offset printing method having high alignment precision and high cost or a photolithography method having high alignment precision and high cost but requiring high-temperature and light-irradiation processes. As a result, it is possible to realize a display device with a low-cost touch screen, compared with the case where the offset printing method is used.

Since a printing method such as a screen printing method can be used, the photolithography process is not necessary, for example, in FIGS. 13C to 13H. Therefore, a high-temperature process (200° C. or higher) necessary for the photolithography method is not necessary, thereby achieving low temperature of the process of manufacturing the touch screen 110. The light-irradiation process necessary for the photolithography method is not necessary and thus it is possible to avoid complication of the processes and to decrease the cost, compared with the case where the photolithography method is used.

The touch screen 110 can be formed directly on the liquid crystal display panel 218 in which a liquid crystal is enclosed due to the low temperature of the processes. Accordingly, it is not necessary to provide the glass substrate 103 to the touch screen 110 and thus to realize a liquid crystal display panel with a light and thin touch screen and a display device having the liquid crystal display panel 218. That is, it is possible to realize the liquid crystal display panel 218 having the capacitive touch screen 110 with the similar weight and thickness to the liquid crystal display panel of the related art.

One or more embodiments of the invention is not limited to the above-mentioned embodiment and modified example, but may employ substantially the same configuration and method as described in the embodiment and modified example and any configuration or method which can achieve the similar operational effect or advantages.

What is claimed is:

1. A display device with a touch screen, comprising:
   a display device that has a display area; and
   a touch screen that has a detection area including a transparent electrode and a peripheral area located around the detection area, the touch screen being disposed on the display area of the display device;
   wherein the transparent electrode includes an end electrode at an end of the detection area;
   wherein the peripheral area includes a signal line disposed along a side of the detection area;
   wherein a connection electrode is connected between the end electrode and the signal line at the side of the detection area;
   wherein the end electrode is disposed to continuously cover the connection electrode and an area next to an edge of the connection electrode in plan view;
   wherein an insulating film that includes a plurality of protrusions which are disposed between a part of the connection electrode and a part of the end electrode so that the plurality of protrusions extend from the peripheral area to the detection area across the edge of the connection electrode; and
   wherein the end electrode is disposed to overlap both of the plurality of protrusions and the connection electrode in plan view so as to contact with the connection electrode.

2. The display device with a touch screen according to claim 1, wherein the plurality of protrusions of the insulating film are disposed along a length direction of the connection electrode.

3. The display device with a touch screen according to claim 2, wherein the plurality of protrusions of the insulating film are disposed at regular intervals along the length direction of the connection electrode.

4. The display device with a touch screen according to claim 1, wherein the peripheral area further includes:
   a terminal that serves to transmit information acquired from the detection area to outside; and
   wherein the terminal is connected to the signal line.

5. The display device with a touch screen according to claim 1, wherein the insulating film is formed by using a screen printing process.

6. The display device with a touch screen according to claim 1, wherein the connection electrode, the terminal, and the signal line are formed of a metal material.

7. A display device with a touch screen, comprising:
   a display device that has a display area; and
   a touch screen that has a detection area including a transparent electrode and a peripheral area located around the detection area, the touch screen being disposed on the display area of the display device;
   wherein the transparent electrode includes an end electrode at an end of the detection area;
   wherein the peripheral area includes a signal line disposed along a side of the detection area;
   wherein a connection electrode is connected between the end electrode and the signal line at the side of the detection area;

wherein the end electrode is disposed to continuously cover the connection electrode and an area next to an edge of the connection electrode in plan view;

wherein an insulating film includes a plurality of openings which are disposed across the edge of the connection electrode; and wherein the end electrode is disposed to overlap both of the insulating film and the connection electrode in plan view so as to contact with the connection electrode in the plurality of openings of the insulating film.

8. The display device with a touch screen according to claim 7, wherein the plurality of openings of the insulating film are disposed along the length direction of the connection electrode.

9. The display device with a touch screen according to claim 8, wherein the plurality of openings of the insulating film are disposed at regular intervals along a length direction of the connection electrode.

10. A touch screen having a detection area including a transparent electrode and a peripheral area located around the detection area;

wherein the transparent electrode includes an end electrode at an end of the detection area;

wherein the peripheral area includes a signal line disposed along a side of the detection area;

wherein a connection electrode is connected between the end electrode and the signal line at the side of the detection area;

wherein the end electrode is disposed to continuously cover the connection electrode and an area next to an edge of the connection electrode in plan view;

wherein an insulating film includes a plurality of protrusions which are disposed between a part of the connection electrode and a part of the end electrode so the plurality of protrusions extend from the peripheral area to the detection area across the edge of the connection electrode;

wherein the plurality of protrusions are formed along a length direction of the connection electrode; and wherein the end electrode is disposed to overlap both of the plurality of protrusions and the connection electrode in plan view so as to contact with the connection electrode.

\* \* \* \* \*